Patented Nov. 22, 1932

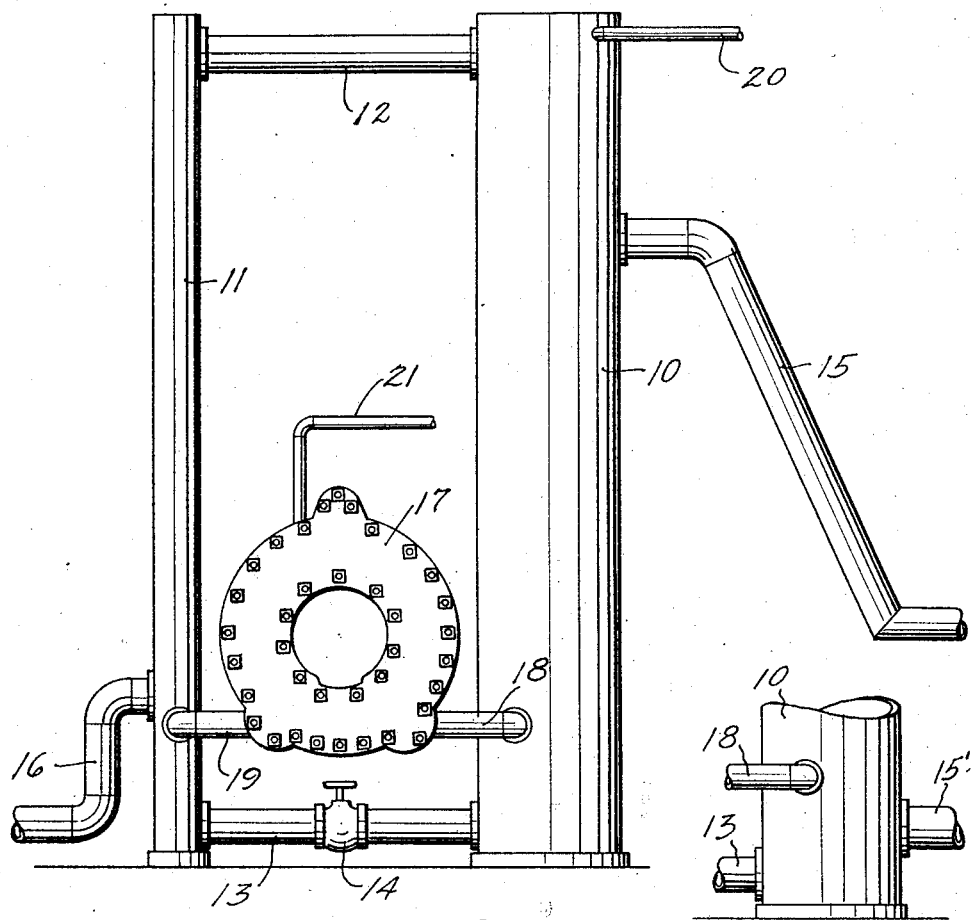
Fig. 1
Fig. 3
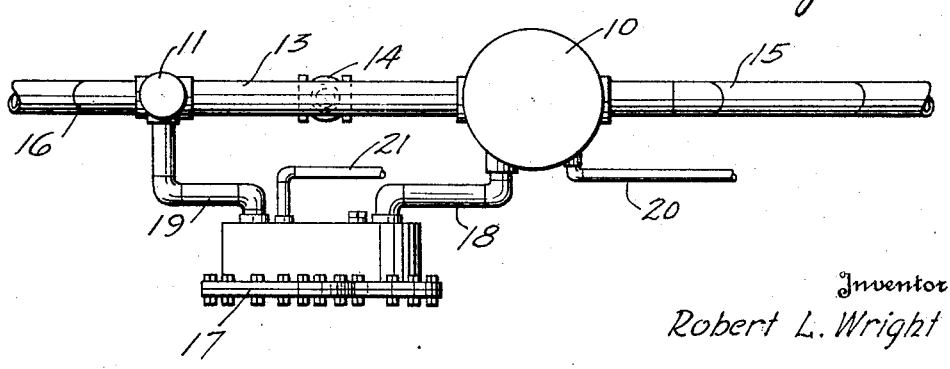
Fig. 2
Inventor
Robert L. Wright

1,888,524

UNITED STATES PATENT OFFICE

ROBERT L. WRIGHT, OF TULSA, OKLAHOMA

BY-PASS CONNECTION FOR METERS

Application filed October 25, 1930. Serial No. 491,299.

This invention relates to new and useful improvements in by-pass connections for meters.

One object of the invention is to provide improved means for by-passing either a fluid, such as air or gas, or a liquid, such as oil or water, around a meter, whereby an excess of either the gas or oil will be taken care of and the meter will not be required to handle either gas or oil beyond its capacity. Where the meter is handling liquid the by-passing of air and gas will make for accuracy in the operation of said meter.

A further object of the invention is to provide an upright container connected with the inlet side of a meter and having sufficient height to permit the liquid to build up to such a height that its hydrostatic pressure or force will overcome the pressure drop through the meter and thus assure gravity operation and effective performance of the meter.

A still further object of the invention is to provide an overflow connection at such an elevation as to permit a rise and fall of the influent and produce a uniform operation of the meter, but to by-pass an excess of gas and oil around the meter. The advantages of this feature are, that should there be an overproduction or supply, the excess will be by-passed around the meter, or if the meter should fail to operate and cause the building up of an excess, the latter will be taken care of.

Another object of the invention is to provide means for trapping out the sand, dirt and other extraneous matter in advance of the meter, thus protecting the latter.

An important object of the invention is to provide a by-pass for a meter, wherein a pressure fluid under pressure greater than atmosphere other than the gas being measured may be introduced to maintain the liquid approximately at the liquid outlet, particularly where the liquid is being discharged against greater than atmospheric pressure.

A construction designed to carry out the invention will be hereinafter described together with other features of the invention.

The invention will be more readily understood from a reading of the following specification and by reference to the accompanying drawing in which an example of the invention is shown, and wherein:

Figure 1 is an elevation of a device constructed in accordance with the invention, Figure 2 is a plan view of the same, Figure 3 is a partial elevation of the tower showing a modified form of inlet.

In the drawing the numeral 10 designates an upright tank or tower and 11 a vertical column or pipe spaced therefrom. The top of the tower is connected with the top of the column by a horizontal pipe 12. A transverse pipe 13 connects the lower ends of the tower and the pipe and includes a valve 14. A supply pipe 15 enters the tower toward the upper end of the latter. This pipe is connected to the well and conducts the effluent therefrom. A discharge pipe 16 leads from the lower portion of the column, but well above the pipe 13.

An oil meter 17 is mounted between the tower and the column and may be of any suitable construction. The inlet side of the meter is connected with the lower portion of the tower by a pipe 18, while the outlet side of the meter is connected with the lower end of the column by a pipe 19. The pipe 19 enters the column just below the pipe 16. A gas supply pipe 20 enters the top of the tower, while a similar pipe 21 is connected to the meter.

While some gas will enter the tower 10 with the oil flowing in from the pipe 15, it is necessary to admit additional gas from the pipe 20. This admitted gas flows through the pipe 12 to the column 11 and builds up sufficient pressure therein to hold the oil therein (discharged from the meter) on a level or slightly below the discharge pipe 16.

As the meter will offer resistance to the passage of the oil, the latter will rise higher in the tower than in the column. This built-up column of oil in the tower will create a "head" or head-pressure. This head pressure is sufficient to force the oil through the meter. If the oil is built up in the tower to the top, it would by-pass through the pipe 12 into the column 11. The tower is high enough to take care of the flow from a surging well.

It is obvious that if the fluid is discharged through the pipe 16 merely against atmospheric pressure, it would not be necessary to add gas from the pipe 20. In order to equalize the gas pressure in the meter the gas supply pipe 21 is used. Those portions of the tower and column situated below the pipes 18 and 19 form sand and dirt traps and these materials are precluded from entering the meter. By opening the valve 14 the tower and column are flushed out by way of the pipe 13.

While I have shown the inlet pipe 15 as entering the tower 10 at above mid-height, it is obvious that this pipe could enter at a lower elevation, as is indicated in Figure 3 where the inlet pipe 15' is shown as entering the tank 10 below the pipe 18. Owing to the resistance offered by the meter, a sufficient head of liquid will be built up in the tower 10 to cause a gravity operation of the meter. The tower 10 is made high enough to take care of fluctuations in the rise and fall of the head therein without overflowing into the column 11, unless there is such an excess as to require by-passing. It is also pointed out that the pressure fluid, such as gas, which is illustrated as being introduced through the pipe, may be introduced in any suitable manner.

Various changes in the size and shape of the different parts, as well as modifications and alterations, may be made within the scope of the appended claims.

Having illustrated and described preferred forms of the invention, what I claim, is:

1. In a by-pass for oil meters, a pair of upright containers, an oil meter connected between the containers to receive oil from one container and discharge it into the other container, an oil inlet pipe connected to the inlet container at an elevation considerably above the meter connection, whereby a head of oil is built up in said inlet container, an outlet pipe extending from the outlet container adjacent the meter connection at a considerably lower elevation than the inlet pipe, and means for admitting to the upper portion of the inlet container fluid under pressure other than the oil or the fluid contained therein, for building up a pressure against the oil discharged from the meter.

2. A by-pass for oil meters as set forth in claim 1, with the upper ends of the containers connected for overflow from the inlet container to the outlet container.

3. In a by-pass for meters, a pair of fluid containers between which the meter is connected, an inlet pipe entering one of the containers, an outlet pipe extending from the other containers, and means separate from the inlet pipe for admitting a fluid to the containers under pressure above atmosphere.

4. In a by-pass for meters, a pair of fluid containers between the lower portions of which the meter is connected, an inlet pipe entering one of the containers, an outlet pipe extending from the other container, a pipe connecting the upper ends of the containers and closed to the atmosphere, and means separate from the inlet pipe for admitting an auxiliary fluid under pressure to the containers.

5. In a by-pass for meters, a pair of fluid containers having meter connections above their bottoms so that extraneous matter may be collected in said bottoms, a pipe connected between the bottoms of the containers including a valve, an inlet pipe entering one of the containers, and an outlet pipe extending from the other container.

6. In a by-pass for oil meters, a pair of upright containers between the lower ends of which the meter is connected, an oil inlet pipe entering one of the containers, an oil outlet pipe extending from the other container, and a pipe connecting the containers below the meter connections and including a valve, whereby extraneous matter may be collected in and discharged from said containers.

7. A by-pass as set forth in claim 3, and means for also introducing the fluid pressure into the meter.

8. In a by-pass for oil meters, an upright tower, an upright column, an oil inlet pipe connected to the tower, a pipe for admitting fluid under pressure connected to the tower above the inlet pipe, a pipe connecting the upper end of the tower with the uper end of the column and closed to the atmosphere, meter connections extending from the tower for connecting a meter therebetween, and a discharge pipe leading from the column adjacent the meter connection, the tower being considerably larger in diameter than the column for providing storage space in the tower for a quantity of oil to build up a head pressure and to compensate fluctuations in the supply.

9. In a by-pass for oil meters, an upright tower, an upright column adjacent thereto, a pipe closed to the atmosphere connecting the upper ends of the tower and column, an oil meter inlet pipe extending from the lower end of the tower, an oil meter outlet pipe connected to the lower end of the column, an oil inlet pipe connected to the tower above mid-height, an oil discharge pipe connected to the column below mid-height and above the meter outlet pipe, and a gas supply pipe connected to the upper end of the tower.

In testimony whereof I affix my signature.

ROBERT L. WRIGHT.